US006219896B1

(12) United States Patent
Levy et al.

(10) Patent No.: US 6,219,896 B1
(45) Date of Patent: Apr. 24, 2001

(54) TOOL FOR INSTALLING VALVE LOCKS

(76) Inventors: Andrew L. Levy, P.O. Box 5356, San Luis Obispo, CA (US) 93403; Harry A. Wouters, 424 Rose La., Paso Robles, CA (US) 93446

( * ) Notice: Subject to any disclaimer, the term of this patent is extended or adjusted under 35 U.S.C. 154(b) by 0 days.

(21) Appl. No.: 09/394,483

(22) Filed: Sep. 11, 1999

(51) Int. Cl.[7] .......................... B23P 19/04

(52) U.S. Cl. .......................... 29/249; 29/214

(58) Field of Search .......................... 29/213.1, 249, 29/282, 280, 275, 214, 888.42, 215

(56) References Cited

U.S. PATENT DOCUMENTS 5,761,785 * 6/1998 Connolly .......................... 29/249
5,915,740 * 6/1999 Weitner .......................... 29/213.1
5,996,202 * 12/1999 Bramante .......................... 29/249

* cited by examiner

*Primary Examiner*—Robert C. Watson
(74) *Attorney, Agent, or Firm*—Daniel C. McKown

(57) ABSTRACT

A hand tool that greatly expedites installation of the valve locks that secure a valve spring retainer to the free end of a valve stem. The valve locks include an inwardly extending ridge that engages a circumferential groove that extends around an end portion of the valve stem. The valve lock is retained in this position by a tapered central bore of the valve spring retainer that produces an inward clamping force on the valve lock. The tool includes a plunger having a diameter equal to the diameter of the valve stem. The user positions the valve locks on the protruding cylindrical surface of the plunger, where they are held by magnetic attraction. The user pushes the end of the tool against the valve spring retainer, thereby compressing the valve spring so that the valve stem pushes the plunger into a close-fitting loader end cap until the valve locks are transferred to the valve stem and into engagement with the circumferential groove.

4 Claims, 5 Drawing Sheets

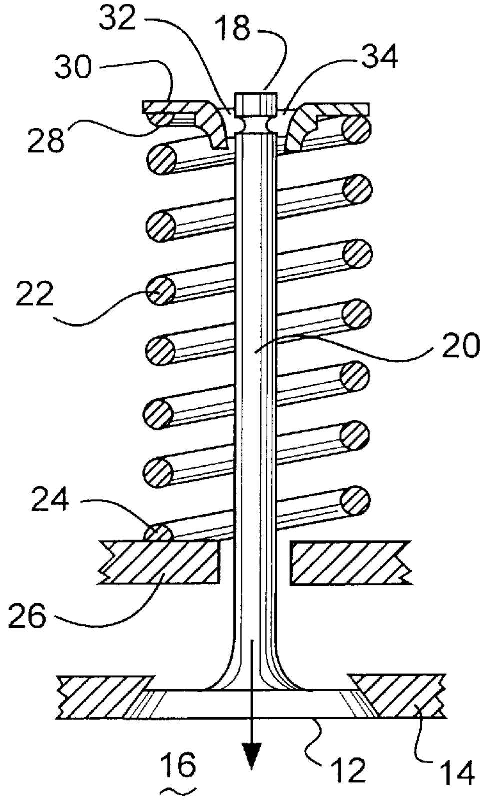
FIG.1
(PRIOR ART)
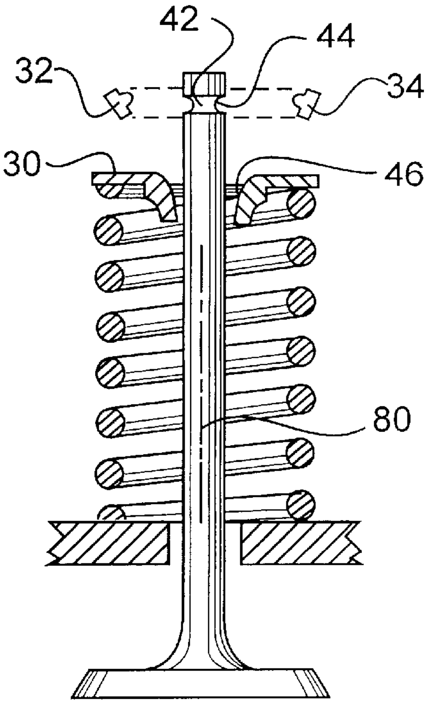
FIG.2
(PRIOR ART)
FIG.3
(PRIOR ART)
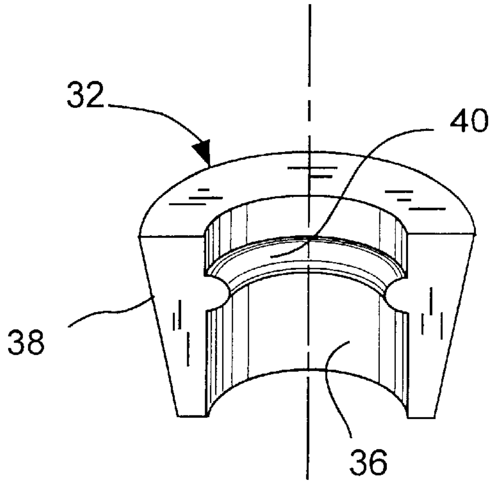

TOOL FOR INSTALLING VALVE LOCKS

BACKGROUND OF THE INVENTION

1. Field of the Invention

The present invention is in the field of automotive mechanics and specifically relates to a tool for installing valve locks on a valve stem. The valve lock removably secures a valve retainer to the valve stem. The tool typically would be used by an automobile mechanic or by an engine reconditioner.

2. The Prior Art

During the compression and expansion cycles, the valves of a conventional internal combustion engine are forced shut by the high pressure within the cylinder. To implement the intake and exhaust cycles, the valves must be opened at appropriate times, and this is usually accomplished by the use of a cam that pushes against the end of the valve stem, thereby forcing the head of the valve into the combustion chamber. To assure positive operation, a valve spring urges the valve to its closed position, and the cam must overcome the urging of the valve spring to open the valve. Typically, the valve spring is a compression spring. One end of the compression spring bears against a stationary part of the engine, and the other end of the spring bears against a valve spring retainer that is removably secured to the valve stem by a valve lock. Were it not for the valve lock, the compressive force of the valve spring would push the retainer off the end of the valve stem. The retainer must be removably secured to the valve stem to permit assembly and disassembly of the valve.

In theory, a nut and washer would suffice to secure the retainer to the valve stem. However, after nearly a century of experience, a specialized type of valve lock is almost universally used. The retainer has a tapered central bore that opens toward the end of the valve stem. The valve stem has an end portion that includes a circumferential groove. The valve lock is a tapered split collar that has an inwardly facing ridge. The ridge engages the circumferential groove of the valve stem and is held in engagement by the taper of the central tapered bore of the retainer. The valve lock is thus jammed between the circumferential groove on the valve stem and the tapered central bore of the retainer, which is urged toward the end of the valve stem by the valve spring.

Although this way of securing the retainer to the valve stem is simple and effective in use, it has proven to be very challenging for most mechanics to take apart and reassemble, which must be done when the valves are ground or the engine is reconditioned.

Part of the difficulty is that the retainer must be drawn back, away from the end of the valve stem against the urging of the valve spring, to expose the valve locks. In contemporary engines, the force exerted by the valve spring is in the range of 60 to 90 pounds, and mere finger pressure generally is not adequate. Another part of the difficulty is that the valve locks are rather small in comparison to the valve stem and are difficult to manipulate. To make matters worse, the valve spring and the retainer are frequently located in a poorly-illuminated and fairly close-fitting recess, which makes the parts somewhat inaccessible.

Large console-type machines are commercially available, but they merely compress the valve springs. They occupy valuable floor space in the shop, and have a high initial cost. It appears that a need exists for a hand tool to facilitate the installing of valve locks.

SUMMARY OF THE INVENTION

The present invention is a hand tool to facilitate the installation of a valve lock into a circumferential groove on a valve stem.

In accordance with the present invention, the tool includes a loader end cap having an end that faces the valve spring retainer when the tool is in use and further includes a central bore extending in the direction of the axis of the valve stem when the tool is in use. A plunger extends through this bore and protrudes beyond the end of the loader end cap. The plunger is biased toward the valve stem and has the same diameter as the valve stem. The valve locks are placed by the user on the protruding cylindrical surface of the plunger, and the axis of the plunger is brought into alignment with the axis of the valve stem. The user then pushes the tool against the valve spring retainer, gradually depressing the retainer by compressing the valve spring, and the end of the valve stem makes contact with the protruding end of the plunger. As the tool is pushed onto the valve stem, the valve stem forces the plunger back into the loader end cap, and the valve locks are pushed onto the valve stem by the loader end cap. The valve locks engage the circumferential groove on the end portion of the valve stem, and as the tool is withdrawn, the retainer advances toward the end of the valve stem also engaging the valve locks and preventing them from coming out of the circumferential groove.

The tool of the present invention permits the valve locks to be installed in a valve in approximately 15 seconds per valve, which is one-third to one-quarter of the time previously required, depending on the mechanic. The hand tool of the present invention occupies no floor space in the shop, and costs only about one-tenth of the cost of the large console-type machines currently on the market.

The operation of the tool as well as its construction will be described in detail in the following paragraphs with the help of the accompanying drawings. The drawings show a preferred embodiment of the invention, but should not be regarded as limiting the scope of the invention.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side elevational view partly in cross section showing a type of valve assembly used in the prior art;

FIG. 2 is a side elevational exploded view partly in cross section showing the removal of the valve locks from the valve stem following compression of the valve spring in the prior art assembly of FIG. 1;

FIG. 3 is a front perspective view of a valve lock of a type used in the prior art and shown enlarged relative to FIGS. 1 and 2;

DETAILED DESCRIPTION OF THE PREFERRED EMBODIMENT

Figure 4:
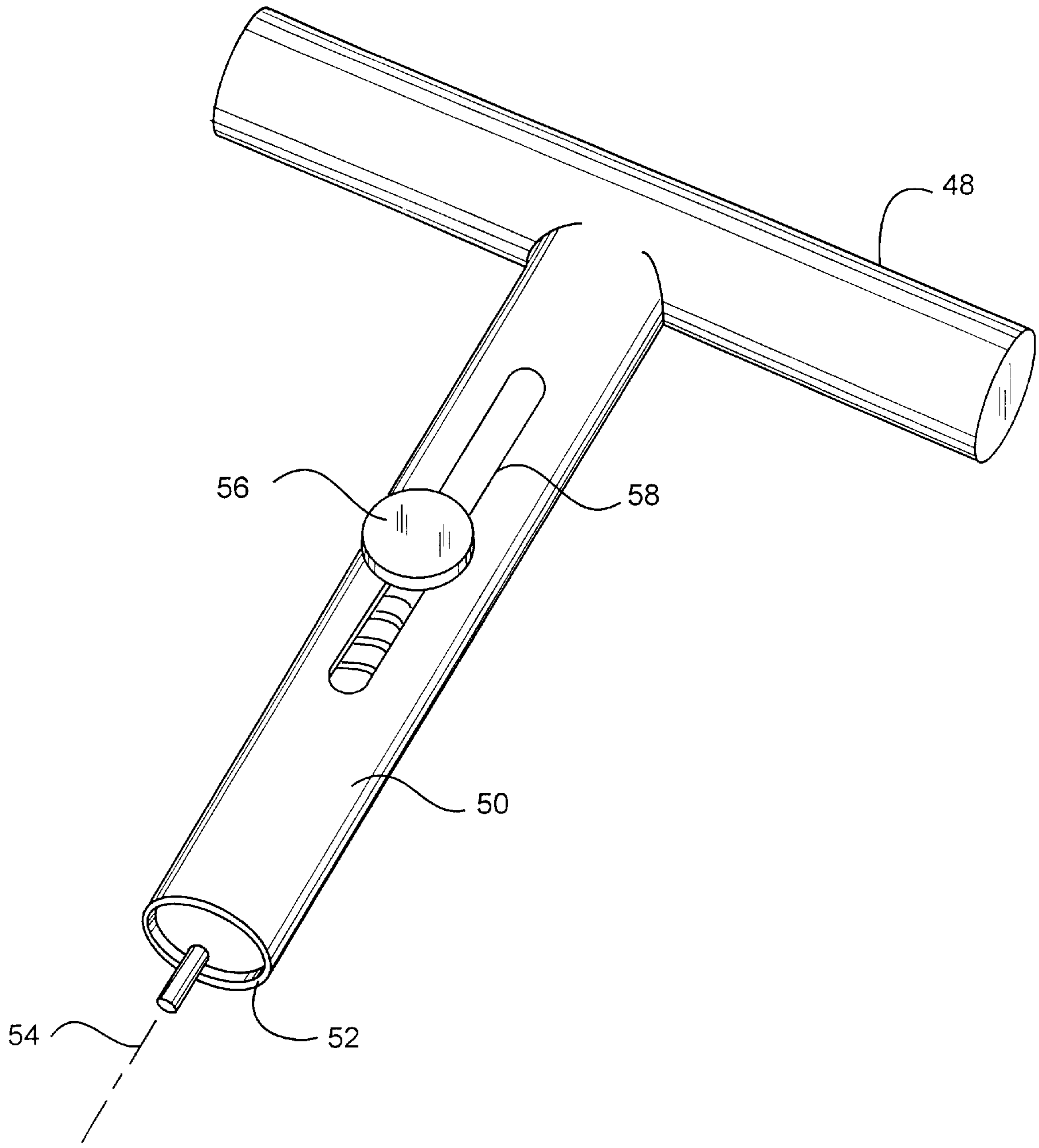
FIG. 4 is a perspective view showing a preferred embodiment of the hand tool of the present invention.

FIG. 1 shows a typical valve assembly of a type used in a contemporary internal combustion engine. The head 12 of the valve forms a movable portion of the wall 14 of the combustion chamber 16. FIG. 1 shows the valve in its closed position, and the valve opens when it is moved in the direction indicated by the arrow. This motion is produced by a cam (not shown) that bears against the end 18 of the valve stem 20.

The head 12 of the valve is biased into its closed position by the valve spring 22, which is a compression spring. One end 24 of the valve spring bears against a fixed portion 26 of the engine. The other end 28 pushes against the valve spring retainer 30 which is attached to the valve stem 20.

The valve spring retainer 30 is removably attached to the valve stem 20 by two valve locks 32 and 34, which are shown diagrammatically in FIG. 2; a single valve lock is shown greatly enlarged and in full detail in FIG. 3. As best seen in FIG. 3, each valve lock includes a cylindrical inwardly-facing surface 36, a tapered outwardly-facing surface 38, and a ridge 40 that protrudes inwardly from the surface 36.

The valve stem 20 includes an end portion 42 into which a circumferential groove 44 has been formed. The valve spring retainer 30 includes a tapered central bore 46.

FIG. 1 shows the valve stem 20, the valve locks 32 and 34 and the valve spring retainer 30 in their normal assembled configuration. In FIG. 2 the valve spring retainer 30 is shown drawn back from the end 18 of the valve stem to permit removal of the valve locks 32 and 34 and subsequent dis-assembly of the valve spring retainer 30 and the valve spring 22.

From FIGS. 1, 2 and 3 it is seen that the ridge 40 of each valve lock engages the circumferential groove 44 of the valve stem 20, and the valve locks 32 and 34 are forced radially inward by the tapered central bore 46 of the valve spring retainer 30 which bears against the tapered outwardly-facing surfaces 38 of the valve locks, the valve spring retainer 30 being pushed toward the end 18 of the valve stem by the valve spring 22.

As mentioned above, the assembly of FIG. 1 is typically located in a recessed portion of the engine and therefore is not easily accessable to most tools. Typically the valve spring is quite stiff and cannot be compressed sufficiently by mere finger pressure to permit the valve locks to be disengaged. Also, typically the valve locks are relatively small, on the order of 6 millimeters in length and 8 millimeters in diameter. The combined result of these factors is to make it difficult to disassemble and to re-assemble the valve assembly.

In an attempt to solve this acute problem, large console-type machines have been developed to support the cylinder head while simultaneously pressing on the valve spring retainers to permit the valve locks to be exposed. These machines typically occupy six square feet of floor space, and they provide no help in handling the valve locks.

In contrast with such large console-type machines, the present invention is a lightweight hand-held tool that is adapted not only to compress the valve spring, but also to set the valve locks into engagement with the circumferential groove of the valve stem. FIG. 4 shows an external view of the tool of the present invention, and FIGS. 5–11 show successive stages in its operation.

FIG. 4 is a perspective view showing the exterior of the hand tool of the present invention. The tool includes a handle 48 affixed to a hollow body 50 having an end 52 and a central axis 54. A knob 56 is used for adjusting the tool and in replacing certain internal parts to adapt the tool for use with various engines. The knob 56 is attached to a threaded bolt (not shown in FIG. 4) that extends through the slot 58.

Figure 5:
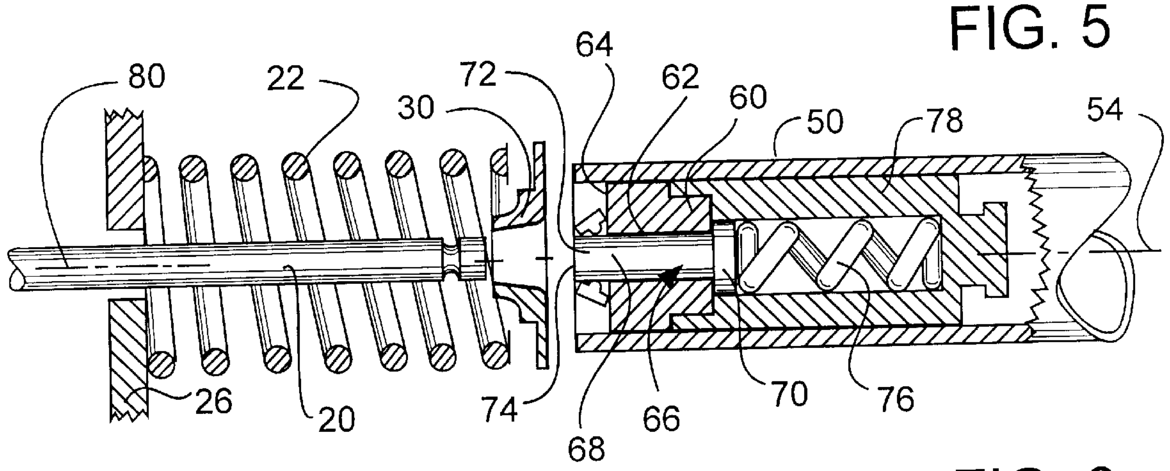
FIG. 5 is a factional side elevational view partly in cross section showing a valve assembly and the tool of the present invention after the tool has been prepared for use but before the tool has been applied to the valve assembly.

FIG. 5 shows the components of the valve assembly discussed above as well as certain essential elements of the tool. These include the hollow body 50, a loader end cap 60 affixed to the hollow body 50, having a central bore 62, and having an end 64. A plunger 66 having a head 70 also includes a cylindrical body 68 that extends through the central bore 62 of the loader end cap 60 and fits therein in a loose sliding fit. When the head 70 of the plunger is in contact with the loader end cap, as in FIGS. 5 and 6, an end portion 72 of the plunger extends beyond the end 64 of the loader end cap. The plunger terminates in an end 74.

The head 70 of the plunger 66 is biased toward the loader end cap 60 by the plunger biasing means 76, which is a compression spring. The spring 76 is contained within a loader body 78.

FIG. 5 shows the condition of the valve assembly and of the tool immediately prior to use. The valve spring 22 has been set in place over the valve stem 20, and the valve spring retainer 30 is positioned at the end of the valve spring 22. The user has placed the valve locks 32 and 34 on the cylindrical surface of the protruding end portion 72 of the plunger 66. The means used to prevent the valve locks from falling off the protruding end of the plunger will be described in greater detail below.

As indicated in FIG. 5, the user has manipulated the tool to bring the central axis 54 into coincidence with the central axis 80 of the valve stem.

Figure 6:
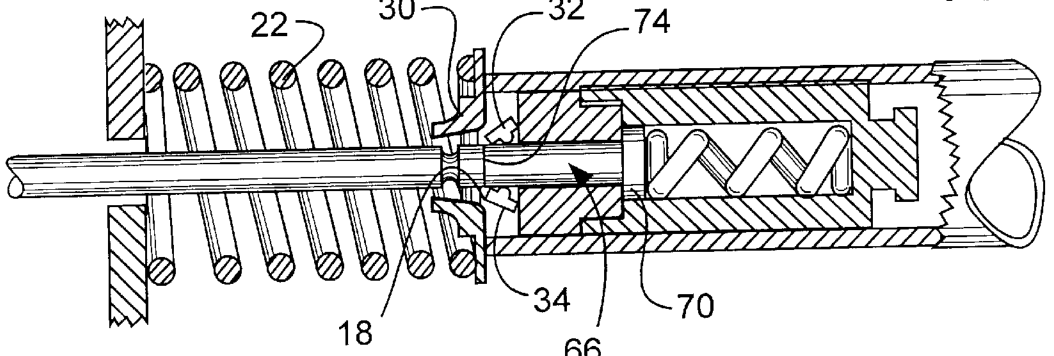
FIG. 6 is a fractional side elevational view partly in cross section showing the tool and the valve assembly at the instant when the end of the valve stem first makes contact with the end of the plunger of the tool.

Next, as shown in FIG. 6, the user pushes the tool against the valve spring retainer 30, compressing the valve spring 22, permitting the tool to advance toward the valve stem sufficiently that the end 18 of the valve stem makes contact with and coincides with the end 74 of the plunger 66.

Figure 7:
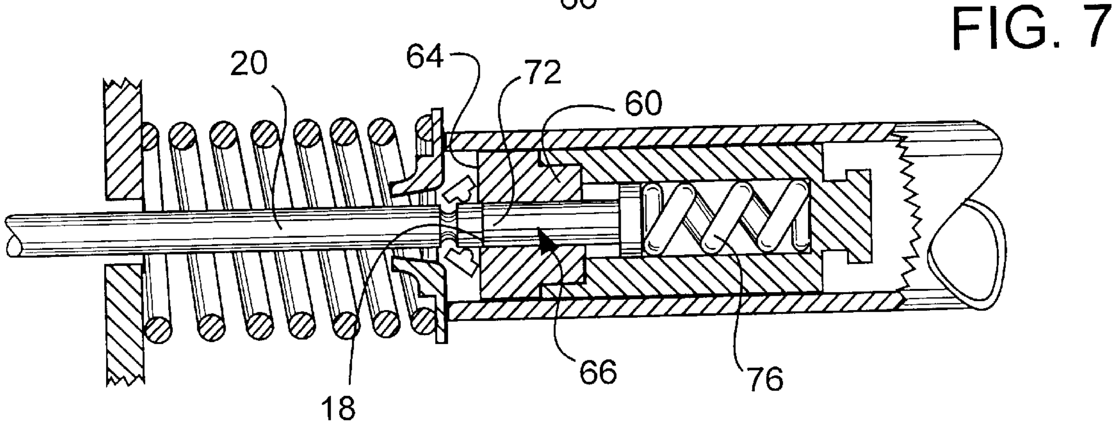
FIG. 7 is a fractional side elevational view partly in cross section showing the tool and the valve assembly after the tool has been used to push back the valve retainer to a greater extent than in FIG. 6, and in which the valve locks have been pushed onto the valve stem.

As the user continues to advance the tool, the end 18 of the valve stem pushes the plunger 66 into the loader end cap 60 against the urging of the spring 76, as shown in FIG. 7. The end 64 of the loader end cap 60 pushes the valve locks

32 and 34 along the end portion 72 of the plunger and thereafter onto the valve stem 20.

Figure 8:
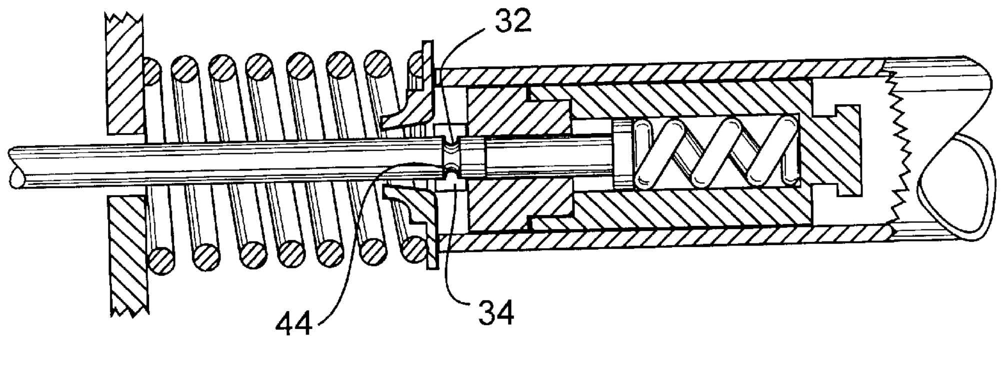
FIG. 8 is a fractional side elevational view partly in cross section showing the tool and the valve assembly after the valve retainer has been pushed back to a greater extent than in FIG. 7, and in which the valve locks have become seated in the circumferential groove of the valve stem.

As the user continues to advance the tool, as shown in FIG. 8, the valve locks 32 and 34 engage the circumferential groove 44 of the valve stem.

Figure 9:
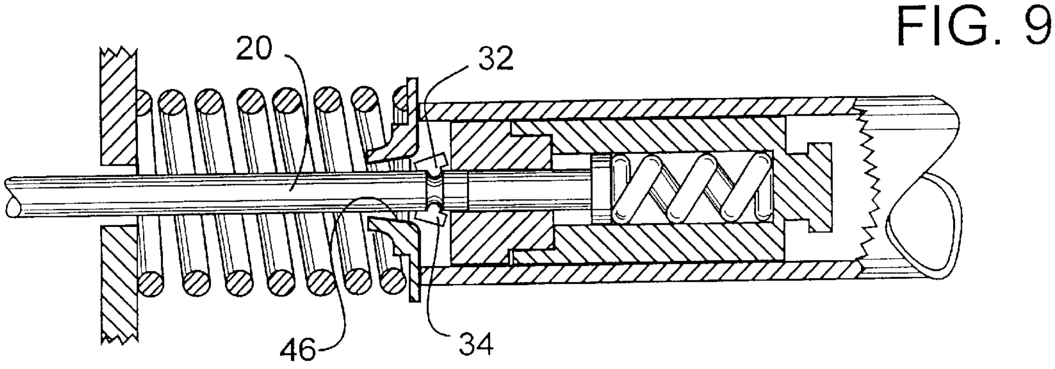
FIG. 9 is a fractional side elevational view partly in cross section showing the tool and the valve assembly as the tool is being withdrawn from the valve assembly.
Figure 10:
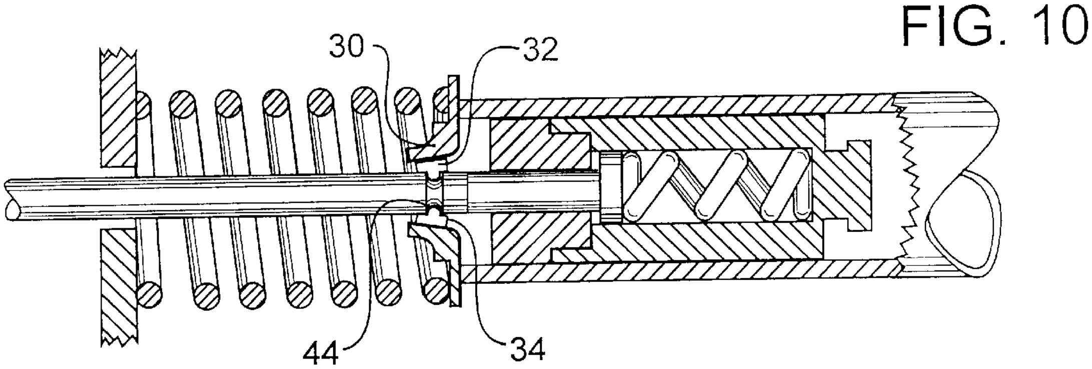
FIG. 10 is a fractional side elevational view partly in cross section showing the tool and the valve assembly with the tool further withdrawn than in FIG. 9 and in which the valve spring retainer engages the valve locks.

Thereafter, the user draws the tool away from the valve stem as indicated in FIG. 9 until, as shown in FIG. 10, the advancing valve spring retainer 30 engages the valve locks 32 and 34. The tapered central bore 46 of the valve spring retainer 30 presses against the valve locks, pushing them radially inward into the circumferential groove 44 and preventing further movement of the valve spring retainer.

Figure 11:
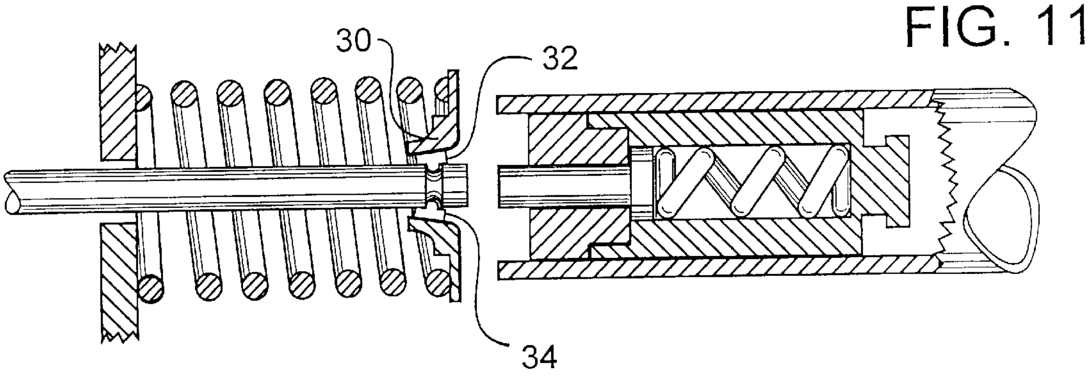
FIG. 11 is a fractional side elevational view partly in cross section showing the tool and the valve assembly after the tool has been withdrawn from the valve assembly; and, FIG. 12 is a fractional side elevational view partly in cross section and enlarged, showing a preferred embodiment of the tool in greater detail.

Finally, as shown in FIG. 11, the tool is removed from the valve spring retainer and the task of seating the valve locks 32 and 34 has been completed.

From the above description it can be recognized that there exists a need for some means for keeping the valve locks 32 and 34 in contact with the end portion 72 of the plunger in the positions shown in FIGS. 5 and 6, and in contact with the end portion 42 of the valve stem, as in FIG. 7. If one or both of the valve locks were to fall off the protruding end portion 72 of the plunger while the tool is being brought into position, the valve lock might fall into the engine or onto the floor, and retrieving it could be time consuming.

In accordance with the present invention, several ways of keeping the valve locks in contact with the plunger have been devised, and they will now be discussed.

Figure 12:
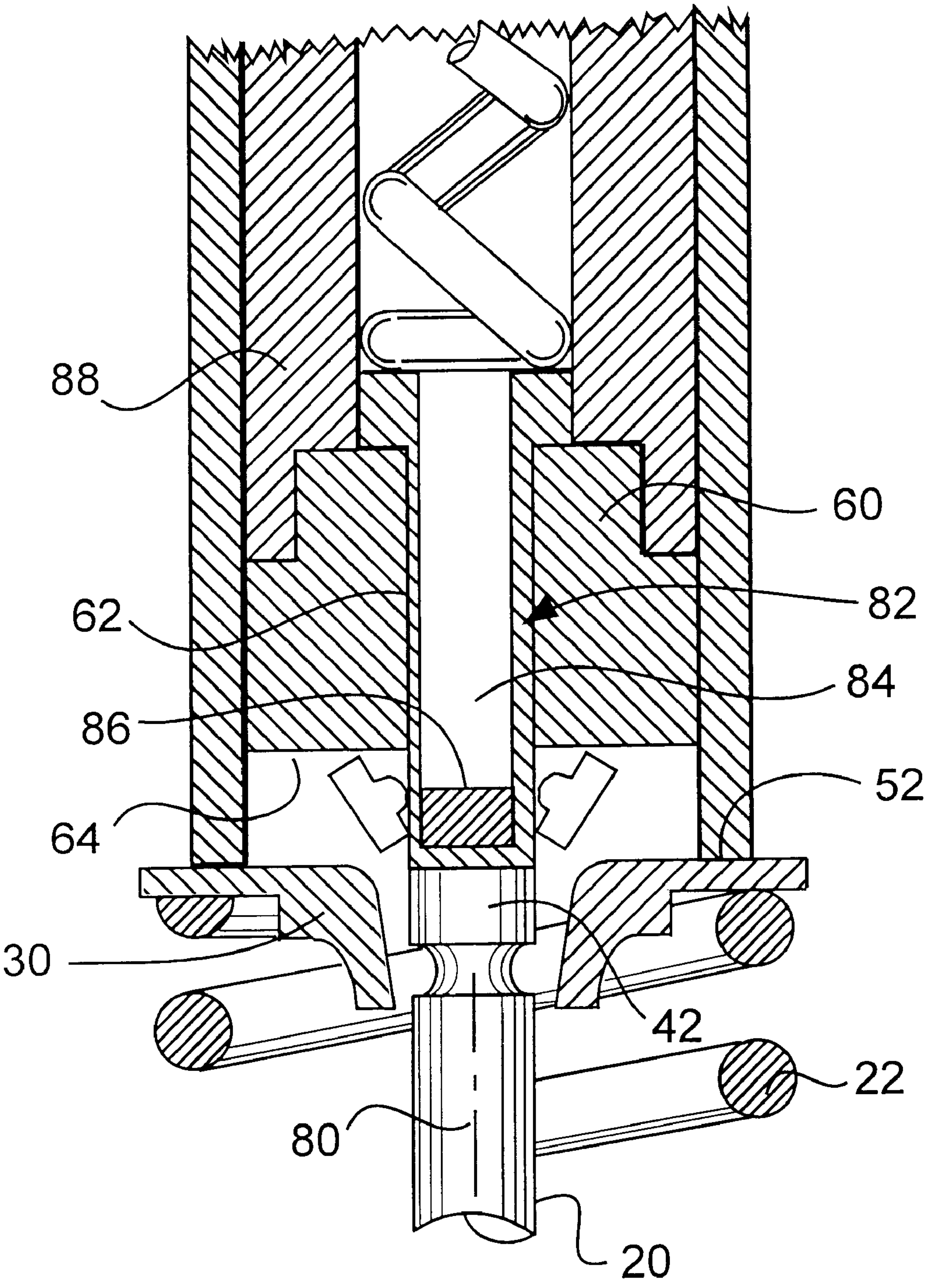

FIG. 12 is an enlarged fraction of FIG. 6. In FIG. 12, the central axis 80 of the valve stem is shown oriented vertically because in practice the valve stem is typically oriented approximately vertically. This permits the user of the tool to use his weight in pushing down on the tool to compress the valve spring. In the preferred embodiment shown in FIG. 12, the plunger 82 is composed of a non-magnetic material such as non-magnetic stainless steel, aluminum, brass, or nylon. The plunger 82 includes a hollow bore that extends almost to the protruding end of the plunger. A powerful cylindrical-shaped permanent magnet 86 is secured to the end of the hollow bore 84 by an adhesive. The north and south poles of the magnet are aligned with the central axis of the bore 84. The loader end cap 60 is composed of a ferromagnetic material, as are the valve locks and the valve stem. In the preferred embodiment, the permanent magnet 86 is composed of a rare earth alloy, which results in an extremely strong magnetic field. The magnetic field attracts the valve locks to the surface of the plunger thereby preventing the valve locks from falling away as the tool is being brought into position.

As indicated in FIGS. 6, 7 and 8, as the user pushes the tool against the valve spring retainer 30, the latter yields and is depressed with respect to the end 18 of the valve stem. Thus, the valve stem pushes the plunger upward, as seen in FIG. 12, so that the permanent magnet 86 is carried into the ferromagnetic loader end cap 60. Because of its ferromagnetism, the loader end cap provides a preferred path for the magnetic lines of flux, which disengage from the valve locks thereby releasing them.

In a first alternative embodiment, the plunger is composed of a ferromagnetic material and is permanently magnetized. The magnetism retains the valve locks against the protruding end of the plunger. In addition, the permanently magnetized plunger magnetizes the end portion 42 of the valve stem, and when the plunger is retracted into the loader end cap, the valve locks are retained in contact with the valve stem by the magnetism.

In a second alternative embodiment, a viscous paste is applied to the protruding end of the plunger, and if necessary to the end portion 42 of the valve stem. The viscous paste may be a grease or a petroleum jelly.

As suggested by FIG. 12, at the instant the ridges 40 of the valve locks seat in the circumferential groove, the valve spring retainer 30 must be sufficiently far down along the valve stem to permit the valve locks to move to their final position. Thus, the distance between the end 64 of the loader end cap 60 and the end 52 of the hollow body must exceed some critical dimension. This critical dimension varies from one engine to the next, because the valve spring retainers and valve stems have different shapes from one engine to the next. In accordance with the present invention, the distance between the end 52 of the hollow body of the tool and the end 64 of the loader end cap is set for a particular engine by inserting a loader body 88 of appropriate length into the hollow body 50 of the tool. For a particular engine, the user must select the appropriate loader body 88 and insert it into the hollow body 50 of the tool along with a loader end cap 60 that has a central bore 62 equal in diameter to the diameter of the valve stem to be worked on.

Thus, there has been described a preferred embodiment and alternative embodiments of the tool of the present invention. The tool greatly expedites the installation of the valve locks, and is considerably less expensive than equipment previously used for installing the valve locks.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A tool for seating a valve lock into a circumferential groove on a valve stem having an axis and having an end, so that the valve lock can be held in place by a tapered spring-loaded valve spring retainer that encircles the valve stem and that is urged toward the end of the valve stem by a valve spring, said tool comprising:

a hollow tool body that has a central axis which the user of the tool brings into alignment with the axis of the valve stem, said tool body having an end that the user of the tool applies against the valve spring retainer to force the valve spring retainer axially away from the end of the valve stem by overcoming the urging of the valve spring;

a loader end cap affixed within a portion of said tool body adjacent the end of said tool body, said loader end cap having an axially extending central bore and having an end facing the valve spring retainer;

a plunger equal in diameter to the valve stem and having a cylindrical body that is adapted to slide axially in a loose sliding fit within the central bore of said loader end cap, the cylindrical body having an end facing the end of the valve stem, said plunger having means for engaging said loader end cap to limit sliding motion of said plunger toward the valve stem so that when said plunger is at its limit position, a portion of said plunger adjacent its end protrudes beyond the end of said loader end cap toward the valve stem, said plunger being permanently magnetized so as to cause the valve lock to cling to the protruding portion of the cylindrical body of said plunger; and, plunger biasing means pushing against said plunger so that as the user forces the valve spring retainer away from the end of the valve stem the end of the valve stem bears against the end of the plunger forcing the protruding portion of the plunger into said loader end cap, the end of said loader end cap preventing the valve lock from moving with said plunger, whereby the valve lock slides onto the valve stem until it seats thereon thereby preventing further progress of the end of the valve stem into the loader end cap, after which the tool is drawn away from the valve stem, permitting the valve spring retainer to advance toward the end of the valve stem, engaging the valve lock and securing it to the valve stem.

2. A tool for seating a valve lock into a circumferential groove on a valve stem having an axis and having an end, so that the valve lock can be held in place by a tapered spring-loaded valve spring retainer that encircles the valve stem and that is urged toward the end of the valve stem by a valve spring, said tool comprising:

a hollow tool body that has a central axis which the user of the tool brings into alignment with the axis of the valve stem, said tool body having an end that the user of the tool applies against the valve spring retainer to force the valve spring retainer axially away from the end of the valve stem by overcoming the urging of the valve spring;

a loader end cap affixed within a portion of said tool body adjacent the end of said tool body, said loader end cap having an axially extending central bore and having an end facing the valve spring retainer;

a plunger equal in diameter to the valve stem and having a cylindrical body that is adapted to slide axially in a loose sliding fit within the central bore of said loader end cap, the cylindrical body having an end facing the end of the valve stem, said plunger having means for engaging said loader end cap to limit sliding motion of said plunger toward the valve stem so that when said plunger is at its limit position, a portion of said plunger adjacent its end protrudes beyond the end of said loader end cap toward the valve stem, said plunger further including a hollow chamber;

plunger biasing means pushing against said plunger so that as the user forces the valve spring retainer away from the end of the valve stem the end of the valve stem bears against the end of the plunger forcing the protruding portion of the plunger into said loader end cap, the end of said loader end cap preventing the valve lock from moving with said plunger, whereby the valve lock slides onto the valve stem until it seats thereon thereby preventing further progress of the end of the valve stem into the loader end cap, after which the tool is drawn away from the valve stem, permitting the valve spring retainer to advance toward the end of the valve stem, engaging the valve lock and securing it to the valve stem; and, a permanent magnet contained within the hollow chamber of said plunger for causing the valve lock to cling to the protruding portion of the cylindrical body of said plunger.

3. A tool for seating a valve lock into a circumferential groove on a valve stem having an axis and having an end, so that the valve lock can be held in place by a tapered spring-loaded valve spring retainer that encircles the valve stem and that is urged toward the end of the valve stem by a valve spring, said tool comprising:

a hollow tool body that has a central axis which the user of the tool brings into alignment with the axis of the valve stem, said tool body having an end that the user of the tool applies against the valve spring retainer to force the valve spring retainer axially away from the end of the valve stem by overcoming the urging of the valve spring;

a loader end cap affixed within a portion of said tool body adjacent the end of said tool body, said loader end cap having an axially extending central bore and having an end facing the valve spring retainer;

a plunger equal in diameter to the valve stem and having a cylindrical body that is adapted to slide axially in a loose sliding fit within the central bore of said loader end cap, the cylindrical body having an end facing the end of the valve stem, said plunger having means for engaging said loader end cap to limit sliding motion of said plunger toward the valve stem so that when said plunger is at its limit position, a portion of said plunger adjacent its end protrudes beyond the end of said loader end cap toward the valve stem;

plunger biasing means pushing against said plunger so that as the user forces the valve spring retainer away from the end of the valve stem the end of the valve stem bears against the end of the plunger forcing the protruding portion of the plunger into said loader end cap, the end of said loader end cap preventing the valve lock from moving with said plunger, whereby the valve lock slides onto the valve stem until it seats thereon thereby preventing further progress of the end of the valve stem into the loader end cap, after which the tool is drawn away from the valve stem, permitting the valve spring retainer to advance toward the end of the valve stem, engaging the valve lock and securing it to the valve stem; and, a viscous paste for causing the valve lock to cling to the protruding portion of the cylindrical body of said plunger.

4. The tool of claim 3 wherein said viscous paste is a grease.

* * * * *